United States Patent Office 3,755,393
Patented Aug. 28, 1973

3,755,393
RECOVERY OF RHODIUM FIXED TO BASIC ION EXCHANGERS IN THE FORM OF RHODIUM CARBONYLATE
Wilhelm Kniese, Limburgerhof, Hans Juergen Nienburg, Ludwigshafen, Juergen Plueckhan, Beindersheim, Walter Himmele, Walldorf, and Werner Aquila, Ludwigshafen, Germany, assignors to Badische Anilin- & Soda-Fabrik Aktiengesellschaft, Ludwigshafen (Rhine), Germany
No Drawing. Filed Sept. 13, 1971, Ser. No. 180,195
Claims priority, application Germany, Sept. 15, 1970, P 20 45 416.4
Int. Cl. C07f 15/00; C22b 3/00
U.S. Cl. 260—429 R      7 Claims

ABSTRACT OF THE DISCLOSURE

Process for the recovery of rhodium fixed to basic ion exchangers in the form of rhodium carbonylate with simultaneous regeneration of the basic ion exchangers, comprising treating the basic ion exchangers laden with rhodium carbonylate with a mixture of lower alkanols, water and water-soluble aliphatic amines in the presence of molecular oxygen.

---

This invention relates to a process for the recovery of rhodium fixed to basic ion exchangers in the form of rhodium carbonylate with simultaneous regeneration of the basic ion exchangers.

When oxonation mixtures containing rhodium carbonyl as catalyst are treated with basic ion exchangers, a rhodium-free mixture is obtained and the rhodium carbonyl is fixed to the basic ion exchanger in the form of rhodium carbonylate. It is an object of the invention to recover the rhodium fixed on the basic ion exchanger whilst simultaneously regenerating the basic ion exchanger to enable it to be re-used for the removal of rhodium carbonyl complexes from oxonation mixtures.

It is an object of the invention to provide a process in which rhodium fixed to basic ion exchangers is recovered in a simple manner. It is another object of the invention to provide a process in which the ion exchangers are regenerated and rendered suitable for re-use in the removal of rhodium from oxonation mixtures.

In accordance with the present invention these and other objects and advantages are achieved in a process for the recovery of rhodium fixed to basic ion exchangers in the form of rhodium carbonylate with simultaneous regeneration of the basic ion exchangers, which comprises treating the basic ion exchangers laden with rhodium carbonylate with a mixture of lower alkanols, water and water-soluble aliphatic amines in the presence of molecular oxygen.

Preferred ion exchanger resins are those which contain primary, secondary, tertiary or quaternary amine groups. Of particular importance are ion exchanger resins based on polystyrene and containing tertiary or quaternary amino groups in the base form. Particularly suitable are weakly basic to strongly basic ion exchangers such as Amberlite IR 45 or Dowex 4. Of particular commercial importance are macroreticular types such as Amberlyst A21, Lewatite MP 62, Lewatite MP 64, Imac A20, Zerolite G, Amberlite IRA 93 and Amberlyst A 26.

The rhodium carbonylate becomes attached to the basic ion exchanger resins when crude oxondation mixtures are treated with the basic ion exchangers, preferably continuously in a so-called exchanger zone having an $l/d$ ratio of from 5:1 to 50:1, the rate of flow of the mixture through said zone being from 0.1 to 10 kg./hr. per kg. of basic ion exchanger.

The oxonation mixtures used are generally those which have been obtained by reacting aliphatic, cycloaliphatic or araliphatic olefinically unsaturated compounds of up to 20 carbon atoms and optionally containing substituents which are inert under the conditions of the reaction, such as alkoxy groups of from 1 to 4 carbon atoms, hydroxy groups or acyloxy or carboalkoxy groups of from 2 to 10 carbon atoms, particularly olefins of from 2 to 20 carbon atoms, with a mixture of carbon monoxide and hydrogen at temperatures of from 80° to 220° C. and pressures of from 5 to 700 atmospheres in the presence of rhodium carbonyl complexes. The oxonation mixtures mainly contain the corresponding aldehydes and/or alcohols. The concentration of rhodium carbonyl complexes is generally from 10 p.p.m. to 1% by weight based on the crude mixture and calculated as metal.

The treatment of the oxonation mixture with the basic ion exchangers is carried out at temperatures of from 0° to 120° C. and in the presence of carbon monoxide and hydrogen at pressures of from 5 to 700 atmospheres.

Conveniently, the basic ion exchangers are contacted with the oxonation mixture until they are incapable of taking up further rhodium carbonyl complex, as may be readily observed from the content of rhodium in the discharge.

The basic ion exchangers laden with rhodium carbonylate are treated wtih a mixture of lower alkanols, water and water-soluble aliphatic amines. Preferred alkanols are those having from 1 to 4 carbon atoms, in particular methanol and ethanol. Preferred water-soluble aliphatic amines are primary, secondary and tertiary amines having alkyl radicals of from 1 to 4 carbon atoms and optionally substituted by hydroxy groups. Advantageously, the alkanols, water and water-soluble aliphatic amines are used in a ratio by volume of from 1:1:1 to 10:4:1. A ratio of 5:4:1 by volume has proved to be particularly successful.

This treatment is carried out in the presence of molecular oxygen, in particular air. Rates of air flow of from 100 to 1,000 liters per hour per kg. of basic ion exchanger laden with rhodium carbonylate are advantageous.

The mixture of lower alkanols, water and water-soluble aliphatic amines is fed to the basic ion exchangers advantageously at a rate of from 0.1 to 5 liters and especially from 0.1 to 1 liter per hour per kg. of basic ion exchanger. In general, the treatment is carried out at temperatures of from 10° to 100° C. Particularly good results have been obtained at temperatures of from 20° to 90° C.

The process of the invention is carried out for example by passing a mixture of lower alkanols, water and water-soluble aliphatic amines in the specified ratio and air, at the specified rates, upwardly through an exchanger zone containing the basic ion exchanger resin laden with rhodium carbonylate, at the specified temperature, until analysis of the eluate indicates the absence of rhodium. The basic ion exchanger resin thus purified is ready for re-use in separating rhodium from oxonation mixtures. The rhodium-containing eluate is evaporated and the residue is dissolved in semi-concentrated hydrochloric acid. The resulting solution is concentrated to give rhodium chloride monohydrate, which may be re-used as catalyst for the oxo reaction.

The process of the invention is illustrated by the following example.

EXAMPLE

At 100° C., 90 g./hr. of $C_9$ oxonation product, which has been formed by the hydroformylation of octene-1 with carbon monoxide and hydrogen (molar ratio 1:1) at 100° C. and 280 atmospheres in the presence of 106 mg. of rhodium in the form of a carbonyl complex per kg. of octene, are passed through an exchanger zone having a length of 500 mm. and a diameter of 30 mm. and packed with 120 g. of Amberlyst A 21. A total of 26.5 kg. of $C_9$ oxonation product containing a total of 2.0 g. of rhodium are pumped through the exchanger zone. The feed of oxonation mixture is then stopped and the exchanger zone is cooled to room temperature. A mixture of methanol, water and ethanolamine in ratio by volume of 5:4:1 is then passed upwardly through the exchanger zone at a rate of 60 cm.³/hr. while air is also passed upwardly through said zone at a rate of 50 liters per hour (STP). After 79 hours, the temperature is raised to 60° C. and after a further 36 hours the elutriation process is stopped. A total of 1.7 g. of rhodium are recovered, this being 85% of the rhodium originally passed to the exchanger zone. The exchanger is re-usable.

We claim:

1. A process for the recovery of rhodium fixed to basic ion exchangers in the form of rhodium carbonylate with simultaneous regeneration of the basic ion exchangers, which comprises treating a basic ion exchanger laden with rhodium carbonylate with a mixture of an alkanol of from 1 to 4 carbon atoms, water and a water-soluble primary, secondary or tertiary amine having its substituents selected from the group consisting of alkyl radicals of from 1 to 4 carbon atoms and said alkyl radicals substituted by hydroxy, the said mixture of alkanol, water and water-soluble aliphatic amine being used in a ratio by volume of from 1:1:1 to 10:4:1 and in the presence of molecular oxygen.

2. A process as claimed in claim 1, wherein methanol or ethanol is used.

3. A process as claimed in claim 1, wherein a mixture of alkanol, water and water-soluble aliphatic amine is used in a ratio by volume of 5:4:1.

4. A process as claimed in claim 1, wherein air is used at a rate of from 100 to 1,000 liters per hour per kg. of basic ion exchanger.

5. A process as claimed in claim 1, wherein the mixture of lower alkanol, water and water-soluble aliphatic amine is used at a rate of from 0.1 to 5 liters per hour per kg. of basic ion exchanger.

6. A process as claimed in claim 1, wherein temperatures of from 10° to 100° C. are used.

7. A process as claimed in claim 1, wherein said amine is ethanolamine.

References Cited

UNITED STATES PATENTS 3,278,612  10/1966  Greene _____ 260—632
3,629,144  12/1971  Hahn et al. _____ 252—412

DANIEL E. WYMAN, Primary Examiner

A. P. DEMERS, Assistant Examiner

U.S. Cl. X.R.

75—101 BE; 252—412; 260—2.1 R, 429 IO, 604 HF; 423—24, 418